(12) United States Patent
Ma

(10) Patent No.: US 12,399,669 B2
(45) Date of Patent: Aug. 26, 2025

(54) PROCESSING METHOD AND ELECTRONIC DEVICE

(71) Applicant: Lenovo (Beijing) Limited, Beijing (CN)

(72) Inventor: Binqiang Ma, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/521,836

(22) Filed: Nov. 28, 2023

(65) Prior Publication Data

US 2024/0231737 A1 Jul. 11, 2024

(30) Foreign Application Priority Data

Dec. 30, 2022 (CN) .......................... 202211732922.2

(51) Int. Cl.
*G06F 3/14* (2006.01)
*G06F 3/0346* (2013.01)

(52) U.S. Cl.
CPC .......... *G06F 3/1446* (2013.01); *G06F 3/0346* (2013.01)

(58) Field of Classification Search
CPC .............................. G06F 3/1446; G06F 3/0346
See application file for complete search history.

(56) References Cited

U.S. PATENT DOCUMENTS

| 2020/0233536 A1* | 7/2020 | Hong | G06F 1/1641 |
| 2023/0205477 A1* | 6/2023 | Johnson | G06F 3/0346 345/173 |

\* cited by examiner

*Primary Examiner* — Peter D McLoone
(74) *Attorney, Agent, or Firm* — ANOVA LAW GROUP, PLLC

(57) ABSTRACT

A processing method includes determining a first target attitude of an electronic device according to a first detection data set obtained by a sensor set of the electronic device and determining an operating mode of the electronic device at least according to the first target attitude and a second target attitude. The second target attitude is determined according to a second detection data set obtained by the sensor set. Time of obtaining the second detection data set is earlier than time of obtaining the first detection data set.

18 Claims, 4 Drawing Sheets

PROCESSING METHOD AND ELECTRONIC DEVICE

CROSS-REFERENCE TO RELATED APPLICATION

The present disclosure claims priority to Chinese Patent Application No. 202211732922.2, filed on Dec. 30, 2022, the entire content of which is incorporated herein by reference.

TECHNICAL FIELD

The present disclosure relates to the electronic technology field and, more particularly, to a processing method, an electronic device, and a storage medium.

BACKGROUND

An operating mode of a device is usually determined according to a current attitude of the device. Thus, the accuracy is low, and the application scene is limited.

SUMMARY

An aspect of the present disclosure provides a processing method. The method includes determining a first target attitude of an electronic device according to a first detection data set obtained by a sensor set of the electronic device and determining an operating mode of the electronic device at least according to the first target attitude and a second target attitude. The second target attitude is determined according to a second detection data set obtained by the sensor set. Time of obtaining the second detection data set is earlier than time of obtaining the first detection data set.

An aspect of the present disclosure provides an electronic device, including a first body, a second body, a connection apparatus, a sensor set, and a processor. The first body is in a plate-like form and includes a first side and a second side opposite to each other. The second body is in a plate-like form and includes a third side and a fourth side opposite to each other. The connection apparatus is connected to a first end of the first body and a second end of the second body to allow the first body to rotate relative to the second body in a first method and a second method. A rotation reference of the first method and the second end of the second body satisfy a parallel condition. A rotation reference of the second method and the second body satisfy a perpendicular condition. The sensor set is arranged in the first body and the second body. The processor is configured to determine a first target attitude according to a first detection data set obtained by the sensor set and determine an operating mode at least according to the first target attitude and the second target attitude. The second target attitude is determined according to a second detection data set obtained by the sensor set. Time of obtaining the second detection data set is earlier than time of obtaining the first detection data set.

DETAILED DESCRIPTION OF THE EMBODIMENTS

Figure 1:
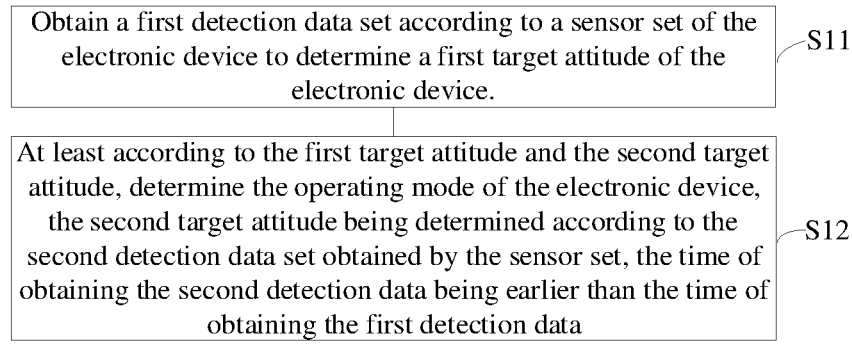
FIG. 1 illustrates a schematic flowchart of a processing method according to some embodiments of the present disclosure.

To make the purposes, technical solutions, and advantages of the present disclosure clearer, the present disclosure is described in detail in connection with the accompanying drawings. The described embodiments should not be considered to limit the scope of the present disclosure. All other embodiments obtained by those skilled in the art without creative efforts are within the scope of the present disclosure.

In the following description, the term "some embodiments" describes a subset of all possible embodiments. "Some embodiments" can be a same subset or different subsets of all possible embodiments and can be combined with each other when there is no conflict.

In the following description, the terms "first," "second," and "third" are merely used to distinguish similar objects and do not represent a specific order. The terms "first," "second," and "third" can be interchanged in a specific sequence or order. Thus, embodiments of the present disclosure can be implemented in an order other than the order shown or described here.

Unless otherwise defined, all technical and scientific terms of the present disclosure have the same meanings as commonly understood by those skilled in the art. The terms used in the present disclosure are merely for the purpose of describing embodiments of the present disclosure and are not intended to limit the present disclosure.

In the related technology, an operating mode of a device can be determined through the current attitude of the device. Thus, the accuracy is low. For a scene with a plurality of screens, Lid open, and rotation, the operating mode of the device cannot be determined merely through the current attitude. Thus, the application scene of determining the operating mode of the device through the current attitude of the device can be limited.

Embodiments of the present disclosure provide a processing method, including determining the operating mode of the device through a first target attitude and a history attitude. On one aspect, the accuracy of determining the operating mode can be improved, especially compared to determining the operating mode only through the current attitude. Thus, the possibility of a wrong operating mode caused by misjudgment can be lowered, and the user experience can be further improved. On another aspect, the processing method can be applied to the scenes with the plurality of screens, Lid open, and rotation to broaden the application range of the electronic device. The processing method of embodiments of the present disclosure can be performed by the electronic device. The electronic device can include various types of terminals such as a laptop, a tablet, a desktop, or a mobile device (e.g., a mobile phone, a portable music player, a personal digital assistant, a dedicated messaging device, or a portable gaming device).

Further, the technical solution of embodiments of the present disclosure is described in detail in connection with the accompanying drawings of embodiments of the present disclosure.

FIG. 1 illustrates a schematic flowchart of a processing method according to some embodiments of the present disclosure. As shown in FIG. 1, the method includes processes S11 and S12.

At S11, a first detection data set is obtained according to a sensor set of the electronic device to determine a first target attitude of the electronic device.

In some embodiments, the electronic device can include at least the sensor set. The sensor set can be any suitable sensor set capable of collecting data. For example, the sensor set can include at least one sensor configured to collect an angle, an open/close state, an orientation, a position, and a distance. In some embodiments, those skilled in the art can autonomously set the sensor set according to actual needs, which is not limited in the present disclosure.

The first target attitude can be any suitable attitude that can represent the shape of the electronic device. In some embodiments, the first target attitude can include, but is not limited to, the angle between two bodies, the open/close state, and the orientation of a display apparatus set.

The first target attitude can be determined in real-time or can be pre-set. In some embodiments, a correspondence between the target attitude and the detection data set can be established in advance. According to the correspondence, the first target attitude corresponding to the first detection data set can be obtained. The correspondence can be stored in the electronic device or in other electronic devices. When the correspondence is stored in the electronic device, the electronic device can determine the first target attitude matching the first detection data set from the correspondence according to the first detection data set. When the correspondence relationship is stored in the other electronic devices, the electronic device can send the first detection data set to the other electronic devices to allow the other electronic devices to determine the first target attitude matching the first detection data set within the correspondence and return the corresponding first target attitude to the electronic device. In some embodiments, those skilled in the art can autonomously set the correspondence between the detection data set and the target attitude according to actual needs, which is not limited in the present disclosure.

In some embodiments, the correspondence can be set according to predefined rules. The predefined rules can include, but are not limited to, a system configuration of the electronic device, user customization, user preference, usage frequency, user operation information, etc. In some embodiments, those skilled in the art can autonomously set the predefined rules according to actual needs, which is not limited in embodiments of the present disclosure.

For example, a configuration option can be provided on a page. The user can customize to set the correspondence through the configuration option.

For another example, the correspondence can be determined in real-time according to an operation gesture.

For example, different gestures can correspond to different correspondences. If a user inputs operation gesture "O", the correspondence can include the first detection data set corresponding to the first target attitude and a second detection data set corresponding to a second target attitude. When the user inputs operation gesture "V," the correspondence can include the first detection data set corresponding to the second target attitude, and the second detection data set corresponding to the first target attitude.

For another example, different operation step lengths can correspond to different correspondences. When a sliding distance of the user is within a first length range, the correspondence can include the first detection data set corresponding to the first target attitude and a second detection data set corresponding to a second target attitude. When the sliding distance of the user is within a second length range, the correspondence can include the first detection data set corresponding to the second target attitude, and the second detection data set corresponding to the first target attitude. The first length range can be different from the second length range.

In some embodiments, those skilled in the art can autonomously set a correspondence between the operation gestures and the correspondences according to actual needs, which is not limited in the present disclosure.

In some embodiments, the first target attitude can be determined from the predetermined candidate attitude set. The candidate attitude set can include at least one candidate attitude. In some embodiments, different candidate attitudes can correspond to different detection data sets. Those skilled in the art can autonomously determine the number of candidate attitudes according to actual needs, which is not limited in the present disclosure.

At S12, at least according to the first target attitude and the second target attitude, the operating mode of the electronic device can be determined. The second target attitude can be determined according to the second detection data set obtained by the sensor set. The time of obtaining the second detection data is earlier than the time of obtaining the first detection data.

The electronic device can at least include a display apparatus set and an input apparatus. The display apparatus set can include at least one display apparatus. The display apparatus can include any apparatus capable of realizing the display function, such as a Light-Emitting Diode (LED) screen, a Liquid Crystal Display (LCD), and an Electronic Ink (EINK) screen, etc. The LED screen can include an organic light-emitting diode (OLED) screen, an active-matrix organic light-emitting diode (AMOLED) screen, a Mini LED screen, and a Micro LED screen. The input apparatus can include any apparatus capable of realizing the input function, such as a keyboard, a touchscreen, a touchpad, a mouse, and an audio input apparatus.

The operating mode of the electronic device can include, but is not limited to, a display state of the display apparatus set, and the operation state of the input apparatus. The display state of the display apparatus set can include, but is not limited to, display on, display off, a display position of target content, etc. The operation state of the input apparatus can include, but is not limited to, on, off, etc.

In some embodiments, the display state of the display apparatus set and/or the operation state of the input apparatus can be determined according to the first target attitude and the second target attitude.

In embodiments of the present disclosure, the first target attitude of the electronic device can be determined through the first detection data set obtained by the sensor set of the electronic device. The operating mode of the electronic device can be determined at least according to the first target attitude and the second target attitude. The second target attitude can be determined according to the second detection data set obtained by the sensor set, and the time of obtaining the second detection data set is earlier than the time of obtaining the first detection data set. By determining the operating mode of the electronic device according to the current attitude and history attitude, on one aspect, the accuracy of determining the operating mode can be improved, especially compared to determining the operating mode merely according to the current attitude. Thus, the probability of errors in the operating mode caused by misjudgment can be lowered, and the user experience can be improved. On another aspect, the processing method can be applied to scenes with a plurality of screens, and rotations to broaden the application range of the electronic device.

In some embodiments, processes S11 and S12 can be performed by the processor or the controller of the electronic device or can be performed by the controller and the processor of the electronic device, respectively.

For example, the controller of the electronic device can obtain the first detection data set obtained by the sensor set, determine the first target attitude according to the first detection data set, and send the first target attitude to the processor of the electronic device.

The processor of the electronic device can receive the first target attitude sent by the controller and determine the operating mode of the electronic device according to the first target attitude and the second target attitude. The second target attitude can be determined by the controller obtaining the second detection data set detected by the sensor set.

The controller can be any suitable chip capable of the sensor data processing function, e.g., a sensor hub, a signal processor, or an embedded controller. In some embodiments, those skilled in the art can autonomously select the implementation of the controller according to actual needs, which is not limited in the present disclosure.

In some embodiments, the controller can be independent of the processor. The controller and the processor can communicate with each other through a preset interface, e.g., a Windows Management Instrumentation (WMI) interface.

In some embodiments, the processor can be a Central Processing Unit (CPU). In some embodiments, the operating mode of the electronic device can be determined by running an application or an operating system on the CPU.

In some embodiments, determining the operating mode of the electronic device in process S12 includes process S121.

At S121, the display state of the display apparatus set of the electronic device is determined.

The display apparatus set can include at least a first display apparatus and a second display apparatus. The first display apparatus and the second display apparatus can be any apparatus capable of realizing display functions. The first display apparatus and the second display apparatus can be same or different. For example, the first display apparatus can be an EINK screen, and the second display apparatus can be an OLED screen. For another example, both the first display apparatus and the second display apparatus can be OLED screens.

The display state of the display apparatus set can include, but is not limited to, at least one of the display state of the first display apparatus, the display state of the second display apparatus, the target content displayed on the first display apparatus, or the target content displayed in the second display apparatus.

For example, the display state of the display apparatus set can be turning off the first display apparatus, turning on the second display apparatus, and switching the target content from the first display apparatus to the second display apparatus.

For another example, the display state of the display apparatus set can be maintaining the display of the second display apparatus, turning on the first display apparatus, and displaying the target content on the first display apparatus and second display apparatus. Thus, the first display apparatus can be used as a primary screen, and the second display apparatus can be used as an extended or secondary screen.

In embodiments of the present disclosure, the display state of the display apparatus set of the electronic device can be determined according to the first target attitude and the second target attitude. Thus, on one aspect, by determining the display state of the display apparatus set according to the current attitude and the history attitude, the accuracy of determining the display state can be improved. Thus, the possibility of display errors caused by misjudgment can be lowered, and the user experience can be improved. On another aspect, by controlling the display state of the display apparatus set, the power consumption of the display apparatus set can be lowered, and the battery life of the electronic device can be improved.

In some embodiments, determining the operating mode of the electronic device in process S12 includes process S131 and/or process S132.

At S131, when the first target attitude and the second target attitude satisfy the first relationship, the display state of the display apparatus set is maintained.

The first relationship can indicate that the first target attitude is a specific candidate attitude, and the second target attitude is also a specific candidate attitude. In some embodiments, the first target attitude and the second target attitude can be different candidate attitudes determined from the candidate attitude set. The candidate attitude set can include at least one attitude. For example, a tablet attitude, a computer attitude, a rotation attitude, etc. The tablet attitude can indicate that the first body and the second body of the electronic device satisfy an overlap condition. The overlap condition can indicate that the first body and the second body completely or nearly overlap with each other. The computer attitude can indicate that the rotation of the first body and the second body of the electronic device based on a first method can substantially satisfy the angle condition. A rotation reference of the first method and a second end of the second body can satisfy a parallel condition. The angle condition can indicate that an angle can be formed between the first body and the second body. The angle can be greater than 0 degree and smaller than 360 degrees. The parallel condition can indicate that the first body and the second body can be completely or nearly parallel with each other. The rotation attitude can indicate that the rotation reference of the first body and the second body based on the second method can satisfy the angle condition. The rotation reference of the second method and the second body can satisfy the perpendicular condition. The perpendicular condition can indicate that the rotation reference and the second body can be completely or nearly perpendicular to each other.

In some embodiments, the electronic device can also include the first body and the second body connected by a connection apparatus. The first body can include a first side and a second side that are opposite to each other. A first display apparatus can be arranged on the first side, and a second display apparatus can be arranged on the second side. The second body can include a third side and a fourth side that are opposite to each other. In some embodiments, a first end of the first body can be connected to the connection apparatus. A second end of the second body can be connected to the connection apparatus. The first body can rotate relative to the second body in the first method and the second method. The rotation reference of the first method and the second end of the second body can satisfy the parallel condition. The rotation reference of the second method and the second body can satisfy the perpendicular condition. The connection apparatus can be any apparatus capable of realizing the connection, e.g., a shaft, a magnet, etc. In some embodiments, those skilled in the art can autonomously select an implementation of the connection apparatus according to actual needs, which is not limited in the present disclosure.

The first target attitude and the second target attitude can include, but are not limited to, one of a first candidate attitude, a second candidate attitude, a third candidate attitude, a fourth candidate attitude, a fifth candidate attitude, a sixth candidate attitude, a seventh candidate attitude, etc. The first candidate attitude can represent that the second body is on a side of the second display apparatus of the first body, and the first body and the second body can satisfy the first angle condition based on the rotation reference of the first method. The second candidate attitude can represent that the second body is on a side of the second display apparatus of the first body, and the first body and the second body can satisfy the second angle condition based on the rotation reference of the first method. The second angle can be greater than the first angle. The third candidate attitude can represent that the second body is on a side of the first display apparatus of the first body, and the first body and the second body meet the second angle condition based on the rotation reference of the first method. The fourth candidate attitude can represent that the second body is on one side of the first display apparatus of the first body, and the first body and the second body meet the first angle condition based on the rotation reference of the first method. The fifth candidate attitude can represent that the second body is on one side of the first display apparatus of the first body, and the first body and the second body meet the overlap condition based on the rotation reference of the first method. The sixth candidate attitude can represent that the second body is on one side of the second display apparatus of the first body, and the first body and the second body meet the overlap condition based on the rotation reference of the first method. The seventh candidate attitude can represent that the first body and the second body meet the angle condition based on the rotation reference of the second method.

In some embodiments, the first angle can be an angle within a first angle range, and the second angle can be an angle within a second angle range. In practice, the first angle range and the second angle range can be obtained based on a method of user customization, a plurality of experiments, statistics, etc. For example, the first angle range can be (0°, 100°], and the second angle range can be (100°, 180°).

That is, the first candidate attitude can represent that the first body and the second body meet the first angle condition based on the rotation reference of the first method. The first angle can be greater than 0° and not greater than 100°.

The second candidate attitude can represent that the first body and the second body meet the second angle condition based on the rotation reference of the first method. The second angle can be greater than 100° and less than 180°.

For another example, the first angle range can be (0°, 110°], and the second angle range can be (110°, 180°). In some embodiments, the first angle range and the second angle range can be complementary to each other. In some embodiments, for a boundary value (e.g., 110°), anti-vibration processing can be added to prevent repeated switching between two candidate attitudes.

Table 1 illustrates a classification result of candidate attitudes according to embodiments of the present disclosure. As shown in Table 1, three attitudes are included, such as the computer attitude, the tablet attitude, and the rotation attitude.

The computer attitude can include a first-type computer attitude (PC1) and a second-type computer attitude (PC2). PC1 includes attitude 1 (corresponding to the second candidate attitude) and attitude 2 (corresponding to the second candidate attitude). PC2 includes attitude 3 (corresponding to the third candidate attitude) and attitude 4 (corresponding to the fourth candidate attitude).

The tablet attitude can further include a first-type tablet attitude (Tablet1) and the second-type tablet attitude (Tablet2). Tablet1 includes attitude 5 (corresponding to the fifth candidate attitude). Tablet2 includes attitude 6 (corresponding to the sixth candidate attitude).

The rotation attitude includes attitude 7 (corresponding to the seventh candidate attitude).

TABLE 1

Classification result of candidate attitudes

| | | | Trigger condition 1 | Trigger condition 2 | Diagram |
|---|---|---|---|---|---|
| Computer (PC) | PC1 | Attitude 1 | 0/1/1/1 | 0~110° | |
| | | Attitude 2 | 0/1/1/1 | 110~180° | |
| | PC2 | Attitude 3 | 1/0/1/1 | 110~180° | |
| | | Attitude 4 | 1/0/1/1 | 0~110° | |
| Tablet | Tablet1 | Attitude 5 | 1/0/1/0 | NA | |
| | Tablet2 | Attitude 6 | 0/1/0/1 | NA | |
| Rotation | | Attitude 7 | 1/1/1/1 | 0~180° | |

In some embodiments, the user can set more or less candidate attitudes according to the actual needs, which is not limited in the present disclosure.

For example, the seven candidate attitudes can be divided into 11 candidate attitudes. That is, the first candidate attitude can include a first candidate sub-attitude and a second candidate sub-attitude. The third candidate attitude can include a third candidate sub-attitude and a fourth candidate sub-attitude. The seventh candidate attitude can include a fifth candidate sub-attitude, a sixth candidate sub-attitude, and a seventh candidate sub-attitude.

The first candidate sub-attitude can represent that the first body and the second body meet a first sub-angle condition based on the rotation reference of the first method. The second candidate sub-attitude can represent that the first body and the second body meet a second sub-angle condition based on the rotation reference of the first method. The first sub-angle can be smaller than the second sub-angle. In some embodiments, the first angle range can be divided into a first sub-angle range and a second sub-angle range. The first sub-angle can be in the first sub-angle range, and the second sub-angle can be in the second sub-angle range.

The third candidate sub-attitude can represent that the first body and the second body meet the second sub-angle condition based on the rotation reference of the first method. The fourth candidate sub-attitude can represent that the first body and the second body meet the first sub-angle condition based on the rotation reference of the first method.

The fifth candidate sub-attitude can represent that the first body and the second body meet a third sub-angle condition based on the rotation reference of the second method. The sixth candidate sub-attitude can represent that the first body and the second body meet a fourth sub-angle condition based on the rotation reference of the second method. The seventh candidate sub-attitude can represent that the first body and the second body meet a fifth sub-angle condition based on the rotation reference of the second method. The third sub-angle can be greater than the fifth sub-angle, and the fifth sub-angle can be greater than the fourth sub-angle. In some embodiments, the third sub-angle can be in the third angle range, the fourth sub-angle can be in the fourth angle range, and the fifth sub-angle can be in the fifth angle range. In some embodiments, the third angle range, the fourth angle range, and the fifth angle range can be obtained based on the user customization, the plurality of experiments, and the statistics. For example, the third angle range can be (170°, 190°], the fourth angle range can be (−10°, 10°], and the fifth angle range can be [10°, 170°].

That is, the fifth candidate sub-attitude can represent that the first body and the second body meet the third sub-angle condition based on the rotation reference of the second method. The third sub-angle can be greater than 170° and smaller than 190°.

The sixth candidate sub-attitude can represent that the first body and the second body meet the fourth sub-angle condition based on the rotation reference of the second method. The fourth sub-angle can be greater than 10° and smaller than 10°.

The seventh candidate sub-attitude can represent that the first body and the second body meet the fifth sub-angle condition based on the rotation reference of the second method. The fifth sub-angle can be not smaller than 10° and not greater than 170°.

Table 2 illustrates a classification result of candidate attitudes according to embodiments of the present disclosure.

TABLE 2

Classification result of candidate attitudes

|  |  |  | Trigger condition 1 | Trigger condition 2 | Diagram |
|---|---|---|---|---|---|
| Computer (PC) | PC1 | Attitude 11 | 0/1/1/1 | 0~70° |  |
|  |  | Attitude 12 | 0/1/1/1 | 70~110° |  |
|  |  | Attitude 2 | 0/1/1/1 | 110~180° |  |
|  | PC2 | Attitude 3 | 1/0/1/1 | 110~180° |  |
|  |  | Attitude 41 | 1/0/1/1 | 70~110° |  |
|  |  | Attitude 42 | 1/0/1/1 | 0~70° |  |
| Tablet | Tablet1 | Attitude 5 | 1/0/1/0 | NA |  |
|  | Tablet2 | Attitude 6 | 0/1/0/1 | NA |  |
| Rotation |  | Attitude 71 | 1/1/1/1 | 180 +/− 10° |  |
|  |  | Attitude 72 | 1/1/1/1 | 0 +/− 10° |  |
|  |  | Attitude 73 | 1/1/1/1 | 10~170° |  |

Three types of attitudes are included, i.e., the computer attitude, the tablet attitude, and the rotation attitude.

The computer attitude can include the first-type computer attitude (PC1) and the second-type computer attitude (PC2). PC1 includes attitude 11 (corresponding to the first candidate sub-attitude), attitude 12 (corresponding to the second candidate sub-attitude), and attitude 2 (corresponding to the second candidate attitude). PC2 includes attitude 3 (corresponding to the third candidate attitude), attitude 41 (corresponding to the third candidate sub-attitude), and attitude 42 (corresponding to the fourth candidate sub-attitude).

The tablet attitude includes the first-type tablet attitude (Tablet1) and the second-type tablet attitude (Tablet2). Tablet1 includes attitude 5 (corresponding to the fifth candidate attitude). Tablet2 includes attitude 6 (corresponding to the sixth candidate attitude).

The rotation attitude includes attitude 71 (corresponding to the fifth candidate sub-attitude), attitude 72 (corresponding to the sixth candidate sub-attitude), and attitude 73 (corresponding to the seventh candidate sub-attitude).

In some embodiments, process S131 of the first target attitude and the second target attitude satisfying the first relationship includes at least one of process S141 to process S144.

At S141, the second target attitude is the first candidate attitude or the third candidate attitude, and the first target attitude is the sixth candidate attitude or the seventh candidate attitude.

At S142, the second target attitude is the second candidate attitude or the fourth candidate attitude, and the first target attitude is the fifth candidate attitude or the seventh candidate attitude.

At S143, the second target attitude is the fifth candidate attitude, and the first target attitude is the fourth candidate attitude.

At S144, the second target attitude is the sixth candidate attitude, and the first target attitude is the first candidate attitude.

In some embodiments, process S131 of the first target attitude and the second target attitude satisfying the first relationship includes at least one of process S151 to process S155.

At S151, the first target attitude is the first candidate attitude, and the second target attitude is the sixth candidate attitude.

At S152, the first target attitude is the fourth candidate attitude, and the second target attitude is the fifth candidate attitude.

At S153, the first target attitude is the fifth candidate attitude, and the second target attitude is the second candidate attitude or the fourth candidate attitude.

At S154, the first target attitude is the sixth candidate attitude, and the second target attitude is the first candidate attitude or the third candidate attitude.

At S155, the first target attitude is the seventh candidate attitude, and the second target attitude is the first candidate attitude, the second candidate attitude, the third candidate attitude, or the fourth candidate attitude.

At S132, when the first target attitude and the second target attitude satisfy the second relationship, the display state of the display apparatus set is switched.

The second relationship can represent that the first target attitude is a specific candidate attitude, and the second target attitude is a specific candidate attitude. Switching the display state of the display apparatus set can include but is not limited to at least one of switching the display state of the first display apparatus, switching the display state of the second display apparatus, or switching the target content between the first display apparatus and the second display apparatus for display.

In some embodiments, process S132 of the first target attitude and the second target attitude satisfying the second relationship includes at least one of process 161 to process S165.

At S161, the second target attitude is the first candidate attitude, and the first target attitude is the second candidate attitude.

At S162, the second target attitude is the second candidate attitude, and the first target attitude is the first candidate attitude.

At S163, the second target attitude is the third candidate attitude, and the first target attitude is the fourth candidate attitude.

At S164, the second target attitude is the fourth candidate attitude, and the first target attitude is the third candidate attitude.

At S165, the second target attitude is the seventh candidate attitude, and the first target attitude is the first candidate attitude, the second candidate attitude, the third candidate attitude, or the fourth candidate attitude.

Table 3 illustrates display states of a display apparatus set according to embodiments of the present disclosure.

TABLE 3

Display states of display apparatus set

| History | Current | | | | | | |
|---|---|---|---|---|---|---|---|
| | Attitude 1 | Attitude 2 | Attitude 3 | Attitude 4 | Attitude 5 | Attitude 6 | Attitude 7 |
| Attitude 1 | N/A | Switch | N/A | N/A | N/A | Maintain | Maintain |
| Attitude 2 | Switch | N/A | N/A | N/A | Maintain | N/A | Maintain |
| Attitude 3 | N/A | N/A | N/A | Switch | N/A | Maintain | Maintain |
| Attitude 4 | N/A | N/A | Switch | N/A | Maintain | N/A | Maintain |
| Attitude 5 | N/A | N/A | N/A | Maintain | N/A | N/A | N/A |
| Attitude 6 | Maintain | N/A | N/A | N/A | N/A | N/A | N/A |
| Attitude 7 | Switch | Switch | Switch | Switch | N/A | N/A | N/A |

"N/A" represents non-existence, "maintain" represents that the display state of the display apparatus set is maintained (i.e., the first target attitude and the second target attitude satisfy the first relationship), and "switch" represents that the display state of the display apparatus set is switched (i.e., the first target attitude and the second target attitude satisfy the second relationship).

When the history attitude (corresponding to the second target attitude) is attitude 1 (corresponding to the first candidate attitude), if the current attitude is attitude 2 (corresponding to the second candidate attitude), the display state of the display apparatus set can be switched. If the current attitude (corresponding to the first target attitude) is attitude 6 (corresponding to the sixth candidate attitude) or attitude 7 (corresponding to the seventh candidate attitude), the display state of the display apparatus set can be maintained.

When the history attitude is attitude 2, if the current attitude is attitude 1, the display state of the display apparatus set can be switched. If the current attitude is attitude 5 (corresponding to the fifth candidate attitude) or attitude 7, the display state of the display apparatus set can be maintained.

When the history attitude is attitude 3 (corresponding to the third candidate attitude), if the current attitude is attitude 4 (corresponding to the fourth candidate attitude), the display state of the display apparatus set can be switched. If the current attitude is attitude 6 or attitude 7, the display state of the display apparatus set can be maintained.

When the history attitude is attitude 4, if the current attitude is attitude 3, the display state of the display apparatus set can be switched. If the current attitude is attitude 5 or attitude 7, the display state of the display apparatus set can be maintained.

When the history attitude is attitude 5, if the current attitude is attitude 4, the display state of the display apparatus set can be maintained.

When the history attitude is attitude 6, if the current attitude is attitude 1, the display state of the display apparatus set can be maintained.

When the history attitude is attitude 7, if the current attitude is attitude 1, attitude 2, attitude 3, or attitude 4, the display state of the display apparatus set can be switched.

In some embodiments, process S132 of the first target attitude and the second target attitude satisfying the second relationship includes at least one of process S171 to process S174.

At S171, the first target attitude is the first candidate attitude, and the second target attitude is the second candidate attitude or the seventh candidate attitude.

At S172, the first target attitude is the second candidate attitude, and the second target attitude is the first candidate attitude or the seventh candidate attitude.

At S173, the first target attitude is the third candidate attitude, and the second target attitude is the fourth candidate attitude or the seventh candidate attitude.

At S174, the first target attitude is the fourth candidate attitude, and the second target attitude is the third candidate attitude or the seventh candidate attitude.

In some embodiments, when the first target attitude and the second target attitude satisfy the first relationship, the display state of the display apparatus set can be maintained, and/or when the first target attitude and the second target attitude satisfy the second relationship, the display state of the display apparatus set can be switched. Thus, by setting the first relationship and the second relationship, the accuracy of the display state of the display apparatus set can be improved. Thus, the possibility of display errors caused by misjudgment can be lowered, and the user experience can be further improved.

In some embodiments, process S12 of determining the operating mode of the electronic device at least according to the first target attitude and the second target attitude further includes process S181.

At S181, the operation state of the input apparatus of the electronic device is determined according to the first target attitude.

The operation state of the input apparatus can include but is not limited to on and off, for example, turning the input apparatus on, and turning the input apparatus off.

In some embodiments, the operation state of the input apparatus can be determined according to the first target attitude. Thus, by determining the operation state of the input apparatus according to the current attitude, the accuracy of determining the operation state of the input apparatus can be improved. Thus, the possibility of input errors caused by misjudgment can be lowered, and the user experience can be improved.

In some embodiments, process S181 includes process S1811 and/or S1812.

At S1811, when the first target attitude satisfies the third relationship, the operation state of the input apparatus is maintained.

The third relationship can represent that the first target attitude is a specific candidate attitude. The third relationship can represent that the first target attitude includes but is not limited to one of the first candidate attitude, the second candidate attitude, the third candidate attitude, the fourth candidate attitude, or the seventh candidate attitude. In some embodiments, since the first candidate attitude to the fourth candidate attitude are computer attitudes, and the seventh candidate attitude is a rotation attitude, the user can touch the input apparatus such as a keyboard and a touchpad. Thus, the input apparatus such as the keyboard and the touchpad can be turned on.

At S1812, when the first target attitude does not satisfy the third relationship, the operation state of the input apparatus is switched.

In some embodiments, when the first target attitude is the fifth candidate attitude or the sixth candidate attitude, the operation state of the input apparatus can be closed. In some embodiments, since the fifth candidate attitude and the sixth candidate attitude are both tablet attitudes, the user cannot touch the input apparatus such as the keyboard and touchpad. Thus, the input apparatus such as the keyboard and the touchpad can be closed.

In some embodiments, when the first target attitude satisfies the third relationship, the operation state of the input apparatus can be maintained, and/or when the first target attitude does not satisfy the third relationship, the operation state of the input apparatus can be switched. Thus, by setting the third relationship, the accuracy of the operation state of the input apparatus can be improved. The possibility of input errors caused by misjudgment can be lowered, and the user experience can be improved.

In some embodiments, process S12 of determining the operating mode of the electronic device at least according to the first target attitude and the second target attitude further includes process S191.

At S191, the display state of the display apparatus set of the electronic device is determined at least according to the first target attitude and the second target attitude, and the operation state of the input apparatus of the electronic device is determined according to the first target attitude.

In embodiments of the present disclosure, the display state of the display apparatus set can be determined according to the first target attitude and the second target attitude, and the operation state of the input apparatus can be determined according to the first target attitude. Thus, the display state of the display apparatus set can be determined according to the history attitude and the current attitude, while the operation state of the input apparatus can be determined according to the current attitude. That is, the states of different apparatuses can be determined in different methods, which improves the accuracy of the states of the apparatuses and the user experience.

Figure 2:
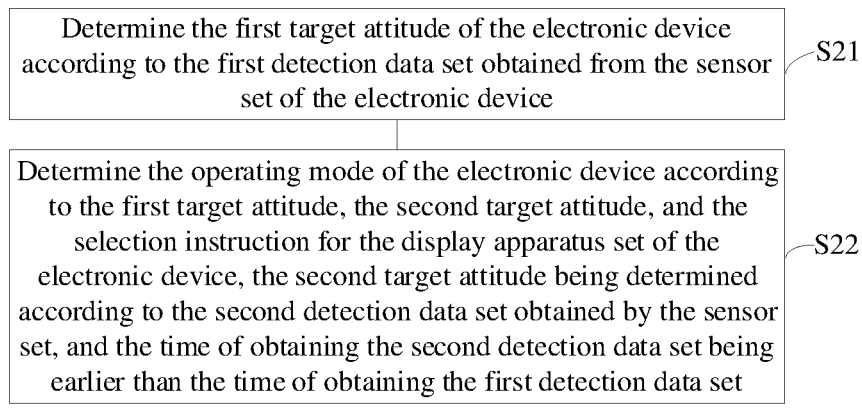
FIG. 2 illustrates a schematic flowchart of a processing method according to some embodiments of the present disclosure.

FIG. 2 illustrates a schematic flowchart of a processing method according to some embodiments of the present disclosure. As shown in FIG. 2, this method includes process S21 and process S22.

At S21, the first target attitude of the electronic device is determined according to the first detection data set obtained from the sensor set of the electronic device.

Process S21 corresponds to process S11. For the implementation of process S21, reference can be made to the description of process S11.

At S22, the operating mode of the electronic device is determined according to the first target attitude, the second target attitude, and the selection instruction for the display apparatus set of the electronic device. The second target attitude is determined according to the second detection data set obtained by the sensor set, and the time of obtaining the second detection data set is earlier than the time of obtaining the first detection data set.

The operating mode of the electronic device can include but is not limited to the display state of the display apparatus set and the operation state of the input apparatus. The display state of the display apparatus set can include but is not limited to turning on the display, turning off the display, and the display position of the target content. The operation state of the input apparatus can include but is not limited to on and off.

The display apparatus set can include the first display apparatus and the second display apparatus. The selection instruction can be generated in any appropriate method. For example, the selection instruction can be generated by pressing the physical key. For another example, the selection instruction can be generated by the gesture input on the operation interface. For another example, the selection instructions can be sent by other electronic devices. In some embodiments, those skilled in the art can determine the generation method for the selection instruction as needed, which is not limited in the present disclosure.

The selection instruction can be used to select the first display apparatus or the second display apparatus.

In some embodiments, different target attitudes can correspond to selecting the same or different display apparatuses. For example, both the first target attitude and the second target attitude can correspond to selecting the first display apparatus or the second display apparatus. For another example, the first target attitude can correspond to selecting the first display apparatus, and the second target attitude can correspond to selecting the second display apparatus. For another example, the first target attitude can correspond to selecting the second display apparatus, and the second target attitude can correspond to selecting the first display apparatus.

In some embodiments, the selection instruction can be used after the second target attitude and before the first target attitude. In some embodiments, the selection instruction can change the selected display apparatus corresponding to the second target attitude. For example, the second target attitude can correspond to selecting the first display apparatus, the selection instruction can be used to select the second display apparatus, and the first target attitude can correspond to selecting the first display apparatus. Then, the operating mode of the electronic device can be switching the display state of the display apparatus set, i.e., closing the second display apparatus, opening the first display apparatus, and switching the target content from the second display apparatus to the first display apparatus for display. If the first target attitude corresponds to selecting the second display apparatus, the operating mode of the electronic device can be maintaining the display state of the display apparatus set, i.e., maintaining the display of the second display apparatus.

In some embodiments, the first target attitude of the electronic device can be determined according to the first detection data obtained by the sensor set of the electronic device. The operating mode of the electronic device can be determined according to the first target attitude, the second target attitude, and the selection instruction for the display apparatus set of the electronic device. The second target attitude can be determined according to the second detection data set obtained by the sensor set. The time of obtaining the second detection data set can be earlier than the time of obtaining the first detection data set. Thus, the operating mode of the electronic device can be determined through the current attitude, the history attitude, and the selection instruction. On one hand, the accuracy of the operating mode can be improved, especially compared to determining the operating mode according to the current attitude, which lowers the probability of operating mode error caused by misjudgment and improves the user experience. On another hand, the electronic device can be applied in complex scenes such as the plurality of screens and rotation, which broadens the application range of the electronic device.

In some embodiments, process S22 of determining the operating mode of the electronic device according to the first target attitude, the second target attitude, and the selection instruction for the display apparatus set of the electronic device includes process S221.

At S221, the display state of the display apparatus set is determined according to the first target attitude, the second target attitude, and the selection instruction for the display apparatus set.

The display state of the display apparatus set can include, but is not limited to, turning on the display, turning off the display, and the display position of the target content.

In some embodiments, process S221 includes processes S231 to S233.

At S231, the first display state of the display apparatus set is determined according to the first target attitude and the second target attitude.

The first display state can include but is not limited to turning on the display, turning off the display, and the display position of the target content.

At S232, the second display state of the display apparatus set is determined according to the selection instructions for the display apparatus set.

The second display state can include but is not limited to turning on the display, turning off the display, and the display position of the target content. In some embodiments, the second display state of the display apparatus set can include turning on the first display apparatus and turning on the second display apparatus.

At S233, the display state of the display apparatus set is determined according to the first display state and the second display state.

The display state of the display apparatus set can be the first display state or the second display state.

In some embodiments, process S233 includes process S241 and/or process S242.

At S241, when the first display state and the second display state are the same, the second display state is determined as the display state of the display apparatus set.

If the first display state and the second display state are the same, the current display state, i.e., the second display state, can be maintained.

At S242, if the first display state and the second display state are different, the first display state is determined as the display state of the display apparatus set.

If the first display state and the second display state are different, the display state can be switched, i.e., from the second display state to the first display state.

In some embodiments, the display state of the display apparatus set can be determined according to the first target attitude, the second target attitude, and the selection instruction for the display apparatus set. On one hand, by determining the display state of the display apparatus set according to the current attitude, history attitudes, and the selection instruction, the accuracy of the display state can be improved, which lowers the probability of the display errors caused by misjudgment and improves the user experience. On another hand, by controlling the display state of the display apparatus set, the power consumption of the display apparatus set can be reduced, and the battery life of the electronic device can be improved.

Figure 3:
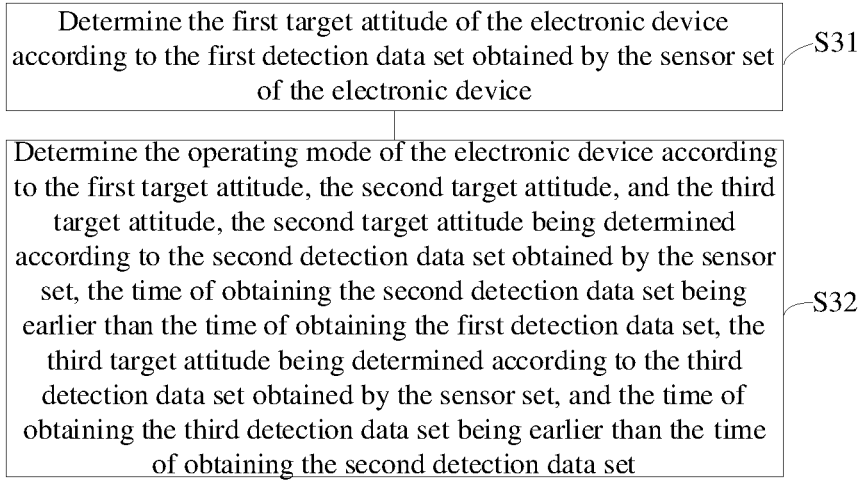
FIG. 3 illustrates a schematic flowchart of a processing method according to some embodiments of the present disclosure closure.

FIG. 3 illustrates a schematic flowchart of a processing method according to some embodiments of the present disclosure closure. As shown in FIG. 3, the method includes process S31 and process S32.

At S31, the first target attitude of the electronic device is determined according to the first detection data set obtained by the sensor set of the electronic device.

Process S31 corresponds to process S11. For the implementation of process S31, reference can be made to the implementation of process S11.

At S32, the operating mode of the electronic device is determined according to the first target attitude, the second target attitude, and the third target attitude. The second target attitude is determined according to the second detection data set obtained by the sensor set. The time of obtaining the second detection data set is earlier than the time of obtaining the first detection data set. The third target attitude is determined according to the third detection data set obtained by the sensor set. The time of obtaining the third detection data set is earlier than the time of obtaining the second detection data set.

The third target attitude can be an attitude before the second target attitude. In some embodiments, the third target attitude can include but is not limited to one of the first candidate attitude, second candidate attitude, third candidate attitude, fourth candidate attitude, fifth candidate attitude, sixth candidate attitude, and seventh candidate attitude.

In some embodiments, the third target attitude and the first target attitude can be the same or different.

In some embodiments, within a time threshold before the switch time, if the third target attitude exists, whether the third target attitude is the same as the first target attitude can be determined. If the third target attitude and the first target attitude are the same, switching between two attitudes can be repeatedly performed. The display state of the display apparatus set can be the display state corresponding to the third target attitude. If the third target attitude and the first target attitude are different, the display state of the display apparatus set may need to be switched. That is, the display state of the display apparatus set can be switched from the display state corresponding to the second target attitude to the display state corresponding to the first target attitude. If the third target attitude does not exist, the display state of the display apparatus set can be switched from the display state corresponding to the second target attitude to the display state corresponding to the first target attitude. The time threshold can be set according to a predetermined rule. The predetermined rule can include but is not limited to the system configuration of the electronic device, the user customization, the user preferences, the use frequency, and the user operation information. In some embodiments, those skilled in the art can autonomously set the predetermined rule according to the actual needs, which is not limited in embodiments of the present disclosure.

In some embodiments, whether the third target attitude exists before the second target attitude can be determined. If the third target attitude exists, whether a time interval between the time of obtaining the third target attitude and the time of obtaining the first target attitude is within the time threshold can be determined. If the time interval is in the time threshold, whether the third target attitude and the first target attitude are the same can be determined. If the third target attitude and the first target attitude are the same, the display state of the display apparatus set can be maintained. If the third target attitude and the first target attitude are different, the display state of the display apparatus set can be switched. If the time interval is not in the time threshold, the display state of the display apparatus set can be switched from the display state corresponding to the second target attitude to the display state corresponding to the first target attitude. If the third target attitude does not exist, the display state of the display apparatus set can be switched from the display state corresponding to the second target attitude to the display state corresponding to the first target attitude.

In some embodiments, process S32 of determining the operating mode of the electronic device according to the first target attitude, the second target attitude, and the third target attitude includes process S321 and/or process S322.

At S321, when the third target attitude exists within the time threshold before the first switch time, and the first target attitude and the third target attitude are the same, the display state of the display apparatus set of the electronic device is maintained.

The first switch time can represent the time of switching from the second target attitude to the first target attitude. The time threshold can be a predefined threshold, for example, 1 second, 3 seconds, etc. If the third target attitude exists within the time threshold before switching to the first target attitude, and the third target attitude and the first target attitude are the same, the display state of the display apparatus set can be maintained to be the display state corresponding to the third target attitude.

At S322, if the third target attitude exists within the time threshold before the first switch time, and the first target attitude and the third target attitude are different, the display state of the display apparatus set is switched.

If the third target attitude exists within the time threshold before switching to the first target attitude, and the third target attitude and the first target attitude are different, then the display state of the display apparatus set may need to be switched from the display state corresponding to the third target attitude to the display state corresponding to the second target attitude, and then from the display state corresponding to the second target attitude to the display state corresponding to the first target attitude.

In some embodiments, the first target attitude of the electronic device can be determined according to the first detection data set obtained by the sensor set of the electronic device. The operating mode of the electronic device can be determined according to the first target attitude, the second target attitude, and the third target attitude. The second target attitude can be determined according to the second detection data set obtained by the sensor set, and the time of obtaining the second detection data set can be earlier than the time of obtaining the first detection data set. The third target attitude can be determined according to the third detection data set obtained by the sensor set, and the time of obtaining the third detection data set can be earlier than the time of obtaining the second detection data set. By determining the operating mode of the electronic device according to the current attitude and a plurality of history attitudes, on one hand, the accuracy of the operating mode can be improved, especially compared to determining the operating mode only based on the current attitude. Thus, the probability of the operating mode error caused by misjudgment can be lowered, and the user experience can be improved. On another hand, the processing method can be applied in complex scenes such as the plurality of screens, rotations, and repeated opening and closing. Thus, the application scope of the electronic device can be broadened.

Figure 4A:
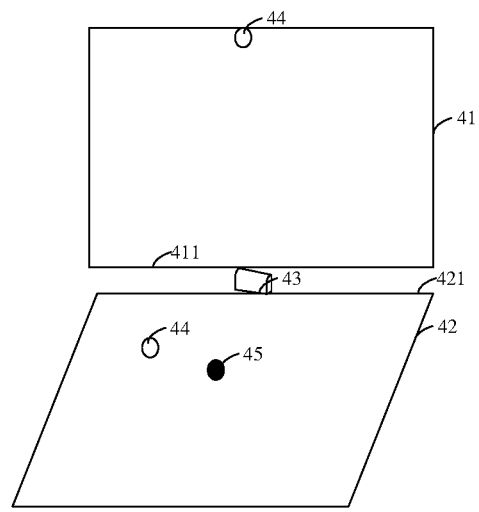
FIG. 4A illustrates a schematic structural diagram of an electronic device according to some embodiments of the present disclosure.

FIG. 4A illustrates a schematic structural diagram of an electronic device 40 according to some embodiments of the present disclosure. As shown in FIG. 4A, the electronic device 40 includes a first body 41, a second body 42, a connection apparatus 43, a sensor set 44, and a processor 45.

The first body 41 is in a plate-shaped form and includes a first side and a second side that are opposite to each other.

The second body 42 is in a plate-shaped form and includes a third side and a fourth side that are opposite to each other.

The connection apparatus 43 is connected to a first end 411 of the first body 41 and to a second end 421 of the second body 42. The first body 41 can rotate relative to the second body 42 in a first method and a second method. The rotation reference of the first method and the second end 421 of the second body 42 can satisfy a parallel condition. The rotation reference of the second method and the second body 41 can satisfy a perpendicular condition.

The sensor set 44 is located within the first body 41 and the second body 42.

The processor 45 can be configured to determine the first target attitude according to the first detection data set obtained by the sensor collection and determine the operating mode at least according to the first target attitude and the second target attitude. The second target attitude can be determined according to the second detection data set obtained by the sensor set, and the time of obtaining the second detection data set can be earlier than the time of obtaining the first detection data set.

In some embodiments, by determining the operating mode of the electronic device according to the current attitude and history attitude, the accuracy of the operating mode can be improved. The probability of operating mode errors caused by the misjudgment can be lowered, and the user experience can be improved. On another hand, the electronic device can be applied to complex scenes such as the plurality of screens, and rotations to broaden the application scope of the electronic device.

In some embodiments, the electronic device further includes a display apparatus set located on the first body. The processor 45 can be further configured to determine the display state of the display apparatus set.

The display apparatus set can include at least one display apparatus. The display apparatus can be any apparatus having a display function, such as OLED, LCD, EINK, etc. The display state of the display apparatus set can include but is not limited to turning on the display, turning off the display, and the display position of the target content. Thus, on one hand, by determining the display state of the display apparatus set according to the current attitude and the history attitude, the accuracy of the display state can be improved especially compared to determining the operating mode only based on the current attitude. The probability of display errors caused by misjudgment can be reduced, and the user experience can be improved. On another hand, by controlling the display state of the display apparatus set, the power consumption of the display apparatus set can be reduced, and the battery life of the electronic device can be improved.

In some embodiments, the display apparatus set can include the first display apparatus arranged on the first side of the first body and the second display apparatus arranged on the second side of the first body. The processor 45 can be further configured to determine the display state of the first display apparatus, determine the display state of the second display apparatus, determine that the target content is displayed on the first display apparatus, and/or determine that the target content is displayed on the second display apparatus.

Both the first display apparatus and the second display apparatus can be any device having the display function. The first display apparatus and the second display apparatus can be the same or different. For example, the first display apparatus can be an EINK screen, and the second display apparatus can be an OLED screen. For another example, both the first display apparatus and the second display apparatus can be OLED screens.

In some embodiments, the first display apparatus and the second display apparatus can be the same or different. For instance, both the first display apparatus and the second display apparatus can be LCD or OLED. For another example, the first display apparatus can be LCD, and the second display apparatus can be OLED. For another example, the first display apparatus can be OLED, and the second display apparatus can be LCD.

In some embodiments, the first display apparatus can be a display apparatus with functions of low power consumption and eye protection. For example, the first display apparatus can be EINK, and the second display apparatus can be LCD or OLED.

In some embodiments, the first display apparatus can also be a display apparatus with low power consumption, eye protection, and good viewing experience. For example, the first display apparatus can be a color EINK, and the second display apparatus can be LCD or OLED.

In some embodiments, the first display apparatus and the second display apparatus can have different display principles. The power consumption of the second display apparatus can be lower than the power consumption of the first display apparatus. The first display apparatus can include a first display unit set. The first display apparatus can be configured to display an image. The first display unit set can display at least three colors. The second display apparatus can include a light-emitting unit and a second display unit set.

The first display unit set can include a plurality of first display units or a plurality of first display unit groups. Each first display unit can include at least three types of charged particles. Different charged particles can have different color attributes. In some embodiments, the distribution of the at least three types of charged particles in the first display unit can be controlled by applying the voltage on the first display unit to cause the first display unit set to display at least three colors.

In some other embodiments, the first display unit group can include at least three third display units and light filters covering the third display units. The third display unit can include two types of charged particles with different colors. The colors of the light filters covering the different third display units in the first display unit group can be different. In some embodiments, by applying the voltage on the third display units in the first display unit group, the distribution of the two types of charged particles in the third display units can be controlled to change the mixed light colors after the light filters of the at least three third display units in the first display unit group are radiated by the external light of the electronic device.

In some embodiments, the sensor set can include a first sensor subset, a second sensor subset, and a third sensor subset. The first sensor subset can be configured to collect the angle between the first body and the second body based on the rotation reference of the first method. The second sensor subset can be configured to collect whether the first body and the second body overlap with each other based on the rotation reference of the first method. The third sensor subset can be configured to collect the attitude between the first body and the second body based on the rotation reference of the second method.

The first sensor subset can be any sensor configured to collect the angle between two bodies, such as a gravity sensor, an angle sensor, etc. In some embodiments, those skilled in the art can autonomously select the first sensor subset as needed, which is not limited in the present disclosure.

The second sensor subset can be any sensor capable of detecting whether the two bodies overlap, such as a Hall sensor, a switch sensor, etc. In some embodiments, those skilled in the art can autonomously select the second sensor subset as needed, which is not limited in the present disclosure.

The third sensor subset can be any sensor capable of collecting the attitude between two bodies, such as a Hall sensor, an image sensor, etc. In some embodiments, those skilled in the art can autonomously select the third sensor subset as needed, which is not limited in the present disclosure.

In some embodiments, the first sensor subset can include at least one of a gravity sensor, an angle sensor, an acceleration sensor, or a distance sensor. The second sensor subset can include at least one of a Hall sensor, a touch sensor, or a switch sensor. The third sensor subset can include at least one of a Hall sensor, an ultrasonic sensor, or an image sensor.

In some embodiments, the first sensor subset can include a first sub-sensor arranged on the first body and a second sub-sensor arranged on the second body. The first sub-sensor and the second sub-sensor can obtain the detection data according to spatial attitude. The second sensor subset can include a third sub-sensor and a fourth sub-sensor arranged on two sides of a third end of the first body and a first trigger assembly arranged at a fourth end of the second body. The third end and the first end of the first body can be two opposite ends. The fourth end and the second end of the second body can be two opposite ends. The third sub-sensor and the fourth sub-sensor can obtain the detection data according to the first trigger assembly. The third sensor subset can include a second trigger assembly arranged at the first end of the first body and the fifth sub-sensor and the sixth sub-sensor arranged on two sides of the second end of the second body. The fifth sub-sensor and the sixth sub-sensor can obtain the detection data according to the second trigger assembly.

Figure 4B:
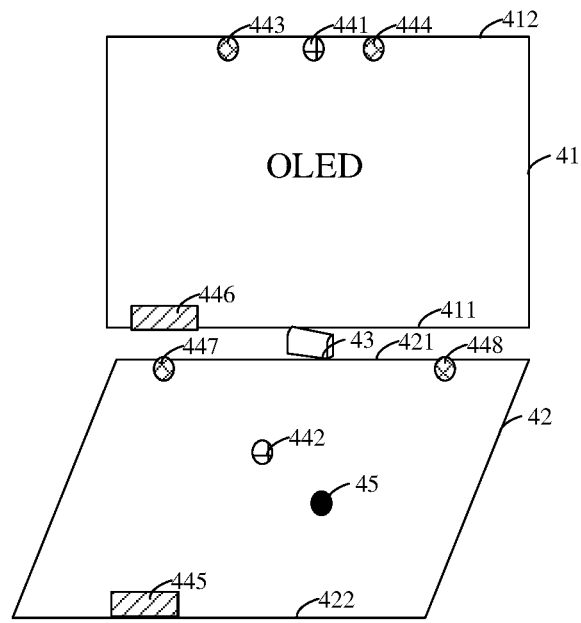
FIG. 4B illustrates a schematic structural diagram of an electronic device according to some embodiments of the present disclosure.

FIG. 4B illustrates a schematic structural diagram of an electronic device according to some embodiments of the present disclosure. As shown in FIG. 4B, the electronic device includes a first body 41, a second body 42, a connection apparatus 43, a processor 45 arranged within the second body 42, a first gravity sensor 441 (corresponding to the first sub-sensor) arranged in the first body 41, a second gravity sensor 442 (corresponding to the second sub-sensor) arranged in the second body 42, a first Hall sensor 443

(corresponding to the third sub-sensor) and a second Hall sensor 444 (corresponding to the fourth sub-sensor) arranged on two sides of the third end 412 of the first body 41, a first magnet assembly 445 (corresponding to the first trigger assembly) arranged on the fourth end 422 of the second body 42, a second magnet assembly 446 (corresponding to the second trigger component) arranged on the first end 411 of the first body 41, a third Hall sensor 447 (corresponding to the fifth sub-sensor) and a fourth Hall sensor 448 (corresponding to the sixth sub-sensor) arranged on two sides of the second end 421 of the second body 42.

The EINK screen (Corresponding to the first display apparatus) can be arranged on the first side of the first body 41. The OLED screen (corresponding to the second display apparatus) can be arranged on a second side of the first body 41.

The first gravity sensor 441 and the second gravity sensor 442 can obtain the detection data according to the spatial attitude.

The first Hall sensor 443 and the second Hall sensor 444 can obtain the detection data according to the first magnet assembly 445.

The third Hall sensor 447 and fourth Hall sensor 448 can obtain the detection data according to the second magnet assembly 446.

In some embodiments, the electronic device further includes a controller. The controller can be configured to obtain the first detection data set detected by the sensor set, determine the first target attitude according to the first detection data set, and send the first target attitude to the processor. The processor 45 can be further configured to obtain the first target attitude sent by the controller and determine the operating mode of the electronic device based on the first target attitude and the second target attitude. The second target attitude can be determined according to the second detection data set detected by the sensor set obtained by the controller.

In some embodiments, the processor 45 can be further configured to maintain the display state of the display apparatus set when the first target attitude and the second target attitude satisfy the first relationship, and/or switch the display state of the display apparatus set when the first target attitude and the second target attitude satisfy the second relationship.

In some embodiments, the first target attitude and the second target attitude can include one of the first candidate attitude, the second candidate attitude, the third candidate attitude, the fourth candidate attitude, the fifth candidate attitude, the sixth candidate attitude, and the seventh candidate attitude. The first candidate attitude can represent that the second body is on one side of the second display apparatus of the first body, and the first body and the second body satisfy the first angle condition based on the rotation reference of the first method. The second candidate attitude can represent that the second body is on a side of the second display apparatus of the first body, and the first body and the second body can satisfy the second angle condition based on the rotation reference of the first method. The second angle can be greater than the first angle. The third candidate attitude can represent that the second body is on a side of the first display apparatus of the first body, and the first body and the second body meet the second angle condition based on the rotation reference of the first method. The fourth candidate attitude can represent that the second body is on one side of the first display apparatus of the first body, and the first body and the second body meet the first angle condition based on the rotation reference of the first method. The fifth candidate attitude can represent that the second body is on one side of the first display apparatus of the first body, and the first body and the second body meet the overlap condition based on the rotation reference of the first method. The sixth candidate attitude can represent that the second body is on one side of the second display apparatus of the first body, and the first body and the second body meet the overlap condition based on the rotation reference of the first method. The seventh candidate attitude can represent that the first body and the second body meet the angle condition based on the rotation reference of the second method.

Table 4 illustrates the classification result of candidate attitudes according to embodiments of the present disclosure. As shown in Table 4, three types of attitudes are included, i.e., the computer attitude, the tablet attitude, and the rotation attitude.

The computer attitude can include a first-type computer attitude (PC1) and a second-type computer attitude (PC2). PC1 includes attitude 1 (corresponding to the second candidate attitude) and attitude 2 (corresponding to the second candidate attitude). PC2 includes attitude 3 (corresponding to the third candidate attitude) and attitude 4 (corresponding to the fourth candidate attitude).

The tablet attitude can further include a first-type tablet attitude (Tablet1) and a second-type tablet attitude (Tablet2). Tablet1 includes attitude 5 (corresponding to the fifth candidate attitude). Tablet2 includes attitude 6 (corresponding to the sixth candidate attitude).

The rotation attitude includes attitude 7 (corresponding to the seventh candidate attitude).

TABLE 4

Classification result of candidate attitudes

| | | | Trigger condition for first sensor subset | Trigger condition for second sensor subset | Trigger condition for third sensor subset | Diagram |
|---|---|---|---|---|---|---|
| Computer (PC) | PC1 | Attitude 1 | 0~110° | 1/1 | 0/1 | |
| | | Attitude 2 | 110~180° | 1/1 | 0/1 | |
| | PC2 | Attitude 3 | 110~180° | 1/1 | 1/0 | |
| | | Attitude 4 | 0~110° | 1/1 | 1/0 | |
| Tablet | Tablet1 | Attitude 5 | NA | 1/0 | 1/0 | |
| | Tablet2 | Attitude 6 | NA | 0/1 | 0/1 | |
| Rotation | | Attitude 7 | 0~180° | 1/1 | 1/1 | |

In some embodiments, the first target attitude and the second target attitude can satisfy the first relationship. The first relationship can include at least one of the second target attitude being the first candidate attitude or the third candidate attitude and the first target attitude being the sixth candidate attitude or the seventh candidate attitude, the second target attitude being the second candidate attitude or the fourth candidate attitude and the first target attitude being the fifth candidate attitude or the seventh candidate attitude, the second target attitude being the fifth candidate attitude and the first target attitude being the fourth candidate attitude, or the second target attitude being the sixth candidate attitude and the first target attitude being the first candidate attitude.

In some embodiments, the first target attitude and the second target attitude can satisfy the second relationship. The second relationship can include at least one of the second target attitude being the first candidate attitude and the first target attitude being the second candidate attitude, the second target attitude being the second candidate attitude and the first target attitude being the first candidate attitude, the second target attitude being the third candidate attitude and the first target attitude being the fourth candidate attitude, the second target attitude being the fourth candidate attitude and the first target attitude being the third candidate attitude, the second target attitude being the seventh candidate attitude and the first target attitude being one of the first candidate attitude, the second candidate attitude, the third candidate attitude, or the fourth candidate attitude.

In some embodiments, the processor 45 can be further configured to determine the display state of the display apparatus set according to the first target attitude, the second target attitude, and the selection instruction of the display apparatus set.

In some embodiments, the processor 45 can be further configured to determine the display state of the display apparatus set according to the first target attitude, the second target attitude, and the selection instruction of the display apparatus set.

In some embodiments, the processor 45 can be configured to determine the first display state of the display apparatus set according to the first target attitude and the second target attitude, determine the second display state of the display apparatus set according to the selection instruction of the display apparatus set, and determine the display state of the display apparatus set according to the first display state and the second display state.

In some embodiments, the processor 45 can be further configured to perform at least one of determining the second display state as the display state of the display apparatus set when the first display state and the second display state are the same or determining the first display state as the display state of the display apparatus set when the first display state and the second display state are different.

In some embodiments, the processor 45 can be further configured to determine the operating mode of the electronic device according to the first target attitude, the second target attitude, and the third target attitude. The third target attitude can be determined according to the third detection data set obtained by the sensor set, and the time of obtaining the third detection data set can be earlier than the time of obtaining the second detection data set.

In some embodiments, the processor 45 can be further configured to perform at least one of maintaining the display state of the display apparatus set of the electronic device when the third target attitude exists in the time threshold before the first switch time, and the first target attitude and the third target attitude are the same, and switching the display state of the display apparatus set when the third target attitude exists in the time threshold before the first switch time, and the first target attitude and the third target attitude are different.

In some embodiments, the electronic device can further include an input apparatus arranged on the third side of the second body. The processor can be further configured to determine the operation state of the input apparatus according to the first target attitude.

In some embodiments, the processor 45 can be configured to perform at least one of maintaining the operation state of the input apparatus when the first target attitude satisfies the third relationship and switching the operation state of the input apparatus when the first target attitude does not satisfy the third relationship.

The description of embodiments of the electronic device can be similar to the description of method embodiments. The device embodiments can have similar beneficial effects to method embodiments. For technical details not described in device embodiments, reference can be made to the description of method embodiments of the present disclosure.

Figure 5:
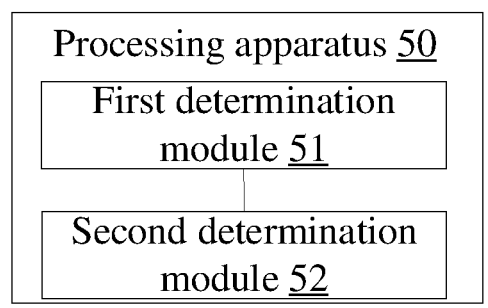
FIG. 5 illustrates a schematic structural diagram of a processing apparatus according to some embodiments of the present disclosure.

Based on the above embodiments, the present disclosure provides a processing apparatus. FIG. 5 illustrates a schematic structural diagram of a processing apparatus 50 according to some embodiments of the present disclosure. As shown in FIG. 5, the apparatus 50 includes a first determination module 51 and a second determination module 52.

The first determination module 51 can be configured to determine the first target attitude of the electronic device according to the first detection data set obtained by the sensor set.

The second determination module 52 can be configured to determine the operating mode of the electronic device according to at least the first target attitude and the second target attitude. The second target attitude can be determined according to the second detection data set obtained by the sensor set, and the time of obtaining the second detection data set can be earlier than the time of obtaining the first detection data set.

In some embodiments, the second determination module 52 can be further configured to determine the display state of the display apparatus set of the electronic device.

In some embodiments, the second determination module 52 can be further configured to perform at least one of determining the display state of the first display apparatus of the display apparatus set, determining the display state of the second display apparatus of the display apparatus set, determining that the target content is displayed on the first display apparatus, or determining that the target content is displayed on the second display apparatus.

In some embodiments, the second determination module 52 can be further configured to perform at least one of maintaining the display state of the display apparatus set when the first target attitude and the second target attitude satisfy the first relationship or switching the display state of the display apparatus set when the first target attitude and the second target attitude satisfy the second relationship.

In some embodiments, the electronic device can include the first body and the second body that are connected to each other through the connection apparatus. The first body can include the first side and the second side that are opposite to each other. The first display apparatus can be arranged on the first side, and the second display apparatus can be arranged on the second side. The second body can include the third side and the fourth side that are opposite to each other. The first end of the first body can be connected to the connection apparatus, and the second end of the second body can be connected to the connection apparatus. The first body can rotate relative to the second body in the first method and the second method. The rotation reference of the first method and the second end of the second body can satisfy the parallel condition. The rotation reference of the second method and the second body can satisfy the perpendicular condition. The first target attitude and the second target attitude can include, but are not limited to, one of a first candidate attitude, a second candidate attitude, a third candidate attitude, a fourth candidate attitude, a fifth candidate attitude, a sixth candidate attitude, a seventh candidate attitude, etc. The first candidate attitude can represent that the second body is on a side of the second display apparatus of the first body, and the first body and the second body can satisfy the first angle condition based on the rotation reference of the first method. The second candidate attitude can represent that the second body is on a side of the second display apparatus of the first body, and the first body and the second body can satisfy the second angle condition based on the rotation reference of the first method. The second angle can be greater than the first angle. The third candidate attitude can represent that the second body is on a side of the first display apparatus of the first body, and the first body and the second body meet the second angle condition based on the rotation reference of the first method. The fourth candidate attitude can represent that the second body is on one side of the first display apparatus of the first body, and the first body and the second body meet the first angle condition based on the rotation reference of the first method. The fifth candidate attitude can represent that the second body is on one side of the first display apparatus of the first body, and the first body and the second body meet the overlap condition based on the rotation reference of the first method. The sixth candidate attitude can represent that the second body is on one side of the second display apparatus of the first body, and the first body and the second body meet the overlap condition based on the rotation reference of the first method. The seventh candidate attitude can represent that the first body and the second body meet the angle condition based on the rotation reference of the second method.

In some embodiments, the first target attitude and the second target attitude satisfying the first relationship can include at least one of the second target attitude being the first candidate attitude or the third candidate attitude and the first target attitude being the sixth candidate attitude or the seventh candidate attitude, the second target attitude being the second candidate attitude or the fourth candidate attitude and the first target attitude being the fifth candidate attitude or the seventh candidate attitude, the second target attitude being the fifth candidate attitude and the first target attitude being the fourth candidate attitude, or the second target attitude being the sixth candidate attitude and the first target attitude being the first candidate attitude.

In some embodiments, the first target attitude and the second target attitude satisfying the second relationship can include at least one of the second target attitude being the first candidate attitude and the first target attitude being the second candidate attitude, the second target attitude being the second candidate attitude and the first target attitude being the first candidate attitude, the second target attitude being the third candidate attitude and the first target attitude being the fourth candidate attitude, the second target attitude being the fourth candidate attitude and the first target attitude being the third candidate attitude, or the second target attitude being the seventh candidate attitude and the first target attitude being the first candidate attitude, the second candidate attitude, the third candidate attitude, or the fourth candidate attitude.

In some embodiments, the second determination module 52 can be further configured to determine the operating mode of the electronic device according to the first target attitude, the second target attitude, and the selection instruction of the display apparatus set.

In some embodiments, the second determination module 52 can be further configured to determine the display state of the display apparatus set according to the first target attitude, the second target attitude, and the selection instruction of the display apparatus set.

In some embodiments, the second determination module 52 can be configured to determine the first display state of the display apparatus set according to the first target attitude and the second target attitude, determine the second display state of the display apparatus set according to the selection instruction of the display apparatus set, and determine the display state of the display apparatus set according to the first display state and the second display state.

In some embodiments, the second determination module 52 can be further configured to perform at least one of determining the second display state as the display state of the display apparatus set when the first display state and the second display state are the same or determining the first display state as the display state of the display apparatus set when the first display state and the second display state are different.

In some embodiments, the second determination module 52 can be further configured to determine the operating mode of the electronic device according to the first target attitude, the second target attitude, and the third target attitude. The third target attitude can be determined according to the third detection data set obtained by the sensor set, and the time of obtaining the third detection data set can be earlier than the time of obtaining the second detection data set.

In some embodiments, the second determination module 52 can be further configured to perform at least one of maintaining the display state of the display apparatus set of the electronic device when the third target attitude exists in the time threshold before the first switch time, and the first target attitude and the third target attitude are the same, and switching the display state of the display apparatus set when the third target attitude exists in the time threshold before the first switch time, and the first target attitude and the third target attitude are different.

In some embodiments, the second determination module 52 can be further configured to determine the operation state of the input apparatus of the electronic device according to the first target attitude.

In some embodiments, the second determination module 52 can be configured to perform at least one of maintaining the operation state of the input apparatus when the first target attitude satisfies the third relationship or switching the operation state of the input apparatus when the first target attitude does not satisfy the third relationship.

The description of apparatus embodiments can be similar to the description of method embodiments. The apparatus embodiments can have similar beneficial effects to the method embodiments. For technical details not described in apparatus embodiments, reference can be made to the description of method embodiments of the present disclosure.

In the present disclosure, if the method is implemented as a software functional module and sold or applied as an independent product, the method can be stored in a computer-readable storage medium. Thus, the technical solutions of the present disclosure or the parts contributing to the existing technology can essentially be embodied in the form of a software product. The software product can be stored on a storage medium and include multiple instructions for enabling an electronic device (e.g., a personal computer, a server, or a network device) to execute some or all of the methods of embodiments of the present disclosure. The storage medium can include various media capable of storing program codes, such as a USB drive, an external hard drive, a Read-Only Memory (ROM), a disk, or an optical disc. Therefore, embodiments of the present disclosure are not limited to any specific hardware and software combination.

The present disclosure provides an electronic device, including a memory and a processor. The memory can store a computer program that can run on the processor. When the computer program is executed by the processor, the processor can implement the method above.

The present disclosure also provides a computer-readable storage medium storing the computer program that, when executed by the processor, causes the processor to implement the method above. The computer-readable storage medium can be transient or non-transient.

Embodiments of the present disclosure provide a computer program product, including a non-transient computer-readable storage medium storing the computer program that, when read and executed by a computer, causes the computer to perform some or all of the steps of the method above. The computer program product can be implemented by hardware, software, or a combination thereof. In some embodiments, the computer program product can be embodied as a computer storage medium. In some other embodiments, the computer program product can be embodied as a software product, such as a Software Development Kit (SDK).

Figure 6:
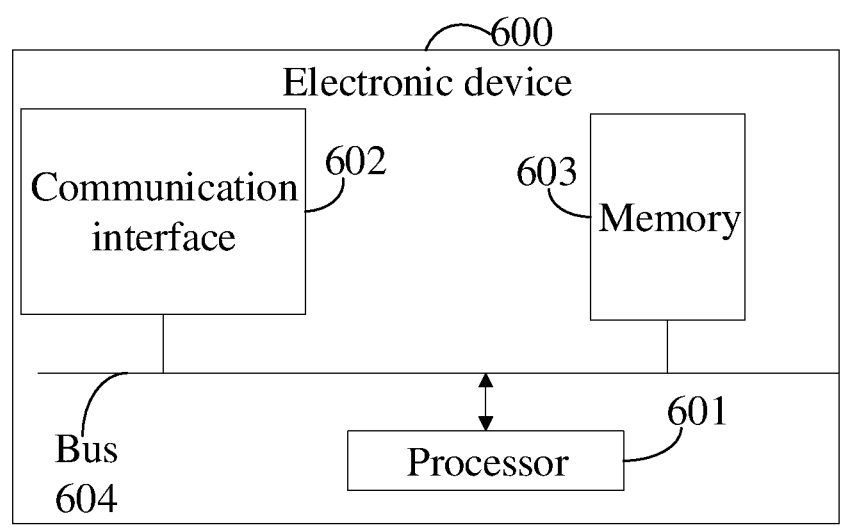
FIG. 6 illustrates a schematic diagram showing a hardware entity of an electronic device according to some embodiments of the present disclosure.

FIG. 6 illustrates a schematic diagram showing hardware of an electronic device 600 according to some embodiments of the present disclosure. As shown in FIG. 6, the hardware of the electronic device 600 includes a processor 601, a communication interface 602, and a memory 603.

The processor 601 can be configured to control the overall operation of the electronic device 600.

The communication interface 602 can be configured to allow the electronic device to communicate with other terminals or servers through a network.

The memory 603 can be used to store instructions and applications that can be executed by the processor 601 and cache data to be processed or data that has been processed by the processor 601 and various modules of the electronic device 600 (e.g., image data, audio data, voice communication data, and video communication data). The memory 603 can include flash memory or random access memory (RAM). The processor 601, the communication interface 602, and the memory 603 can transfer data to each other through a bus 604.

The description of storage medium embodiments and device embodiments is similar to the description of method embodiments and has similar beneficial effects. For technical details not disclosed in storage medium and device embodiments of the present disclosure, reference can be made to the description of method embodiments of the present disclosure.

The term "an embodiment" or "one embodiment" mentioned throughout the specification means that specific features, structures, or characteristics related to the embodiment are included in at least one embodiment of the present disclosure. Therefore, "in one embodiment" or "in an embodiment" in various parts of the specification do not necessarily refer to the same embodiment. In addition, these specific features, structures, or characteristics can be combined in various suitable methods in one or more embodiments. In various embodiments of the present disclosure, the numbered processes do not imply a specific order of execution. The execution order of the processes should be determined by their functionality and internal logic, and should not be considered as a limitation on the implementation processes of embodiments of the present disclosure. The numbering of embodiments of the present disclosure is merely for descriptive purposes and does not imply any superiority or preference of embodiments of the present disclosure.

The terms "comprise," "include," or any variations thereof are intended to encompass non-exclusive inclusion. Thus, a process, a method, an item, or a device that includes a series of elements can include additional elements not explicitly listed, or can include other elements inherent to the process, method, item, or device. When there is no more limitation, an element defined by "including an . . . " does not exclude another identical element in the process, method, item, or device including the element.

In embodiments of the present disclosure, the disclosed device and method can be implemented in other methods. The device embodiments described above are illustrative. For example, the division of the units is merely a logical function division. In some embodiments, other division methods can exist, e.g., a plurality of units or assemblies can be combined or integrated in another system, or some features can be ignored or not be performed. In addition, the coupling, direct coupling, or communicative connection between the various components discussed or illustrated can be indirect coupling or communicative connection through some interfaces, devices, or units, and can be electrical, mechanical, or in another manner.

The units described as separate components may be or may not be physically separated. The components shown as the units may be or may not be physical units, and can be located in one place or distributed over a plurality of network units. Some or all of the units can be selected as needed to implement the purpose of the technical solution of embodiments of the present disclosure.

In addition, the functional units of embodiments of the present disclosure can be integrated in a processing unit or can be used as independent units, respectively. In some embodiments, two or more units can be integrated into one unit. The integrated unit can be implemented by hardware or a combination of hardware and a software functional unit.

Those of ordinary skill in the art can understand that all or some processes of method embodiments can be performed by the program instructing related hardware. The program can be stored in the computer-readable storage medium. When the program is executed, the processes of method embodiments can be performed. The storage medium can include various media capable of storing program codes, such as a mobile storage device, a read-only memory (ROM), discs, or optical discs.

In some other embodiments, if the integrated unit is implemented as a software functional module and sold or used as an independent product, the integrated unit can also be stored in a computer-readable storage medium. Based on this understanding, the technical solutions disclosed here or parts contributing to the existing technology can be essentially embodied in the form of a software product. This computer software product can be stored on a storage medium and includes multiple instructions for enabling the electronic device (e.g., a personal computer, a server, or a network device) to execute some or all of the method of embodiments of the present disclosure. The storage medium can include various media capable of storing program codes, such as a mobile storage device, a ROM, a disk, or an optical disc.

The above description is only embodiments of the present disclosure, but the scope of the present disclosure is not limited to this. Those skilled in the art can easily think of modifications or replacements within the technical scope of the present disclosure. These modifications and replacements are within the scope of the present disclosure.

What is claimed is:

1. A processing method comprising:
   determining a first target attitude of an electronic device according to a first detection data set obtained by a sensor set of the electronic device; and
   determining an operating mode of the electronic device at least according to the first target attitude and a second target attitude, wherein the second target attitude is determined according to a second detection data set obtained by the sensor set, and time of obtaining the second detection data set is earlier than time of obtaining the first detection data set, wherein the electronic device includes a first body and a second body, each of the first target attitude and the second target attitude is selected from a set of candidate attitudes comprising seven or more candidate attitudes, and each candidate attitude in the set of candidate attitudes corresponds to a respective relative posture between the first body and the second body.

2. The method according to claim 1, wherein determining the operating mode of the electronic device includes:
   determining a display state of a display apparatus set of the electronic device, including at least one of:
   determining a display state of a first display apparatus of the display apparatus set;
   determining a display state of a second display apparatus of the display apparatus set;
   determining that target content is displayed on the first display apparatus; or
   determining that the target content is displayed on the second display apparatus.

3. The method according to claim 2, wherein determining the operating mode of the electronic device at least according to the first target attitude and the second target attitude includes at least one of:
   maintaining the display state of the display apparatus set when the first target attitude and the second target attitude satisfy a first relationship; or
   switching the display state of the display apparatus set when the first target attitude and the second target attitude satisfy a second relationship.

4. The method according to claim 3, wherein:
   the first body including a first side and a second side opposite to each other, the first display apparatus being arranged on the first side, and the second display apparatus being arranged on the second side; and
   the second body including a third side and a fourth side opposite to each other;
   wherein:
   the first body and the second are connected through a connection apparatus;
   a first end of the first body is connected to the connection apparatus;
   a second end of the second body is connected to the connection apparatus;
   the first body rotates relative to the second body in a first method and a second method;
   a rotation reference of the first method and the second end of the second body satisfy a parallel condition; and
   a rotation reference of the second method and the second body satisfy a perpendicular condition; and
   the first target attitude and the second target attitude include one of a first candidate attitude, a second candidate attitude, a third candidate attitude, a fourth candidate attitude, a fifth candidate attitude, a sixth candidate attitude, and a seventh candidate attitude;
   wherein:
   the first candidate attitude represents that the second body is on a side of the second display apparatus of the first body, and the first body and the second body satisfy a first angle condition based on the rotation reference of the first method;
   the second candidate attitude represents that the second body is on a side of the second display apparatus of the first body, and the first body and the second body satisfy a second angle condition based on the rotation reference of the first method, a second angle being greater than a first angle;
   the third candidate attitude represents that the second body is on a side of the first display apparatus of the first body, and the first body and the second body satisfy the second angle condition based on the rotation reference of the first method;
   the fourth candidate attitude represents that the second body is on a side of the first display apparatus of the first body, and the first body and the second body satisfy the first angle condition based on the rotation reference of the first method;
   the fifth candidate attitude represents that the second body is on a side of the first display apparatus of the first body, and the first body and the second body satisfy an overlap condition based on the rotation reference of the first method;
   the sixth candidate attitude represents that the second body is on a side of the second display apparatus of the first body, and the first body and the second body satisfy the overlap condition based on the rotation reference of the first method; and
   the seventh candidate attitude represents that the first body and the second body satisfy an angle condition based on the rotation reference of the second method.

5. The method according to claim 4, wherein the first target attitude and the second target attitude satisfying the first relationship includes at least one of:
   the second target attitude being the first candidate attitude or the third candidate attitude, and the first target attitude being the sixth candidate attitude or the seventh candidate attitude;
   the second target attitude being the second candidate attitude or the fourth candidate attitude, and the first target attitude being the fifth candidate attitude or the seventh candidate attitude;
   the second target attitude being the fifth candidate attitude, and the first target attitude being the fourth candidate attitude; or
   the second target attitude being the sixth candidate attitude, and the first target attitude being the first candidate attitude.

6. The method according to claim 4, wherein the first target attitude and the second target attitude satisfying the second relationship includes at least one of:
- the second target attitude being the first candidate attitude, and the first target attitude being the second candidate attitude;
- the second target attitude being the second candidate attitude, and the first target attitude being the first candidate attitude;
- the second target attitude being the third candidate attitude, and the first target attitude being the fourth candidate attitude;
- the second target attitude being the fourth candidate attitude, and the first target attitude being the third candidate attitude; or
- the second target attitude being the seventh candidate attitude, and the first target attitude being the first candidate attitude, the second candidate attitude, the third candidate attitude, or the fourth candidate attitude.

7. The method according to claim 2, wherein determining the operating mode of the electronic device at least based on the first target attitude and the second target attitude includes:
- determining the display state of the display apparatus set according to the first target attitude, the second target attitude, and a selection instruction for the display apparatus set.

8. The method according to claim 7, wherein determining the display state of the display apparatus set based on the first target attitude, the second target attitude, and the selection instruction for the display apparatus set includes:
- determining the first display state of the display apparatus set based on the first target attitude and the second target attitude;
- determining the second display state of the display apparatus set based on the selection instruction for the display apparatus set; and
- determining the display state of the display apparatus set based on the first display state and the second display state.

9. The method according to claim 8, wherein determining the display state of the display apparatus set based on the first display state and the second display state includes:
- determining the second display state as the display state of the display apparatus set when the first display state and the second display state are the same; and
- determining the first display state as the display state of the display apparatus set when the first display state and the second display state are different.

10. The method according to claim 1, wherein determining the operating mode of the electronic device at least based on the first target attitude and the second target attitude includes:
- determining the operating mode of the electronic device based on the first target attitude, the second target attitude, and a third target attitude, the third target attitude being determined based on a third detection data set obtained by the sensor set, and time of obtaining the third detection data set being earlier than the time of obtaining the second detection data set.

11. The method according to claim 10, where determining the operating mode of the electronic device based on the first target attitude, the second target attitude, and the third target attitude includes:
- maintaining the display state of the display apparatus set of the electronic device when the third target attitude exists within a time threshold before a first switch time, and the first target attitude is the same as the third target attitude; and
- switching the display state of the display apparatus set when the third target attitude exists within the time threshold before the first switch time, and the first target attitude is different from the third target attitude.

12. The method according to claim 1, wherein determining the operating mode of the electronic device at least based on the first target attitude and the second target attitude further includes:
- determining an operation state of an input apparatus of the electronic device based on the first target attitude.

13. The method according to claim 12, wherein determining the operation state of the input apparatus of the electronic device based on the first target attitude includes:
- maintaining the operation state of the input apparatus when the first target attitude satisfies a third relationship, the third relationship representing that the first target attitude is a first candidate attitude, a second candidate attitude, a third candidate attitude, a fourth candidate attitude, or a seventh candidate attitude; and
- switching the operation state of the input apparatus when the first target attitude does not satisfy the third relationship.

14. An electronic device comprising:
- a first body in a plate-like form including a first side and a second side opposite to each other;
- a second body in a plate-like form including a third side and a fourth side opposite to each other;
- a connection apparatus connected to a first end of the first body and a second end of the second body to allow the first body to rotate relative to the second body in a first method and a second method, a rotation reference of the first method and the second end of the second body satisfying a parallel condition, and a rotation reference of the second method and the second body satisfying a perpendicular condition;
- a sensor set arranged in the first body and the second body;
- a display apparatus set arranged on the first body, including a first display apparatus arranged on the first side of the first body and a second display apparatus arranged on the second side of the first body;
- wherein:
  - the first display apparatus and the second display apparatus have different display principles, and power consumption of the second display apparatus is lower than power consumption of the first display apparatus;
  - the first display apparatus includes a first display unit set and is configured to display an image;
  - the first display unit set displays at least three colors; and
  - the second display apparatus includes a light-emitting unit and a second display unit set; and
- a processor configured to:
  - determine a first target attitude according to a first detection data set obtained by the sensor set; and
  - determining an operating mode at least according to the first target attitude and the second target attitude;
  - wherein:
    - the second target attitude is determined according to a second detection data set obtained by the sensor set; and time of obtaining the second detection data set is earlier than time of obtaining the first detection data set.

15. The device according to claim 14, wherein the processor is further configured to:
    determine a display state of the display apparatus set;
    determine a display state of the first display apparatus;
    determine a display state of the second display apparatus;
    determine that target content is displayed on the first display apparatus; and/or
    determine that the target content is displayed on the second display apparatus.

16. The device according to claim 14, wherein the sensor set includes:
    a first sensor subset configured to collect an angle between the first body and the second body based on the rotation reference of the first method;
    a second sensor subset configured to collect whether the first body and the second body overlap based on the rotation reference of the first method; and
    a third sensor subset configured to collect an attitude between the first body and the second body based on the rotation reference of the second method.

17. The device according to claim 16, wherein:
    the first sensor subset includes a first sub-sensor arranged on the first body and a second sub-sensor arranged on the second body, the first sub-sensor and the second sub-sensor being able to obtain detection data according to a spatial attitude;
    the second sensor subset includes a third sub-sensor and a fourth sub-sensor arranged on two sides of a third end of the first body and a first trigger assembly arranged on a fourth end of the second body, the third end and the first end of the first body being opposite to each other, and the fourth end and the second end of the second body being opposite to each other, and the third sub-sensor and fourth sub-sensor being able to obtain detection data based on the first trigger assembly; and
    the third sensor subset includes a second trigger assembly arranged on the first end of the first body and a fifth sub-sensor and a sixth sub-sensor arranged on two sides of the second end of the second body, the fifth sub-sensor and the sixth sub-sensor being able to obtain detection data based on the second trigger assembly.

18. An electronic device comprising:
    a first body in a plate-like form including a first side and a second side opposite to each other;
    a second body in a plate-like form including a third side and a fourth side opposite to each other;
    a connection apparatus connected to a first end of the first body and a second end of the second body to allow the first body to rotate relative to the second body in a first method and a second method, a rotation reference of the first method and the second end of the second body satisfying a parallel condition, and a rotation reference of the second method and the second body satisfying a perpendicular condition;
    a sensor set arranged in the first body and the second body;
    wherein the sensor set includes:
        a first sensor subset configured to collect an angle between the first body and the second body based on the rotation reference of the first method;
        a second sensor subset configured to collect whether the first body and the second body overlap based on the rotation reference of the first method; and
        a third sensor subset configured to collect an attitude between the first body and the second body based on the rotation reference of the second method; and
    a processor configured to:
        determine a first target attitude according to a first detection data set obtained by the sensor set; and
        determining an operating mode at least according to the first target attitude and the second target attitude;
    wherein:
        the second target attitude is determined according to a second detection data set obtained by the sensor set; and
        time of obtaining the second detection data set is earlier than time of obtaining the first detection data set.

* * * * *